United States Patent [19]
Yeh

[11] Patent Number: 5,605,734
[45] Date of Patent: Feb. 25, 1997

[54] PHOSPHORESCENT DIRECTIONAL SIGNALS AND MANUFACTURING METHOD

[75] Inventor: Ling Yeh, Anderson, S.C.

[73] Assignee: BASF Corporation, Mt. Olive, N.J.

[21] Appl. No.: 33,990

[22] Filed: Mar. 19, 1993

Related U.S. Application Data

[63] Continuation of Ser. No. 725,959, Jun. 28, 1991, abandoned, which is a continuation of Ser. No. 430,763, Nov. 2, 1989, abandoned.

[51] Int. Cl.⁶ .................................. B32B 3/02; D02G 3/00
[52] U.S. Cl. .................................. 428/97; 428/85; 428/89; 428/359; 428/364
[58] Field of Search ............................. 428/88, 359, 364, 428/85, 97, 372

[56] References Cited

U.S. PATENT DOCUMENTS

| | | | |
|---|---|---|---|
| 2,169,657 | 8/1939 | Millson | 139/420 |
| 2,838,762 | 6/1958 | Wadely | 139/391 |
| 2,968,856 | 1/1961 | Allen | 26/51.5 |
| 3,205,202 | 9/1965 | Schnegg et al. | 528/323 |
| 3,688,804 | 9/1972 | Brown et al. | 139/1 |
| 4,172,069 | 10/1979 | Cordes et al. | 524/413 |
| 4,192,794 | 3/1980 | Wang et al. | 524/291 |
| 4,640,797 | 2/1987 | Goguen | 252/301.36 |
| 4,781,647 | 11/1988 | Doane, Jr. | 428/690 |
| 4,943,896 | 7/1990 | Johnson | 362/84 |
| 5,321,069 | 6/1994 | Owens | 428/365 |

FOREIGN PATENT DOCUMENTS 0173762  3/1986  Germany.

OTHER PUBLICATIONS

English translation of Kollmer, 0173762, Mar., 1986, pp. 1–9.

*Primary Examiner*—Terrel Morris
*Attorney, Agent, or Firm*—Nixon & Vanderhye P.C.

[57] ABSTRACT

Claimed are a method of making a direction indicating carpet, useful in temporarily unlighted building hallways and rooms. Symbols are tufted into the carpet using zinc sulfide copper activated pigments in concentration of 2% in the fiber.

7 Claims, 1 Drawing Sheet

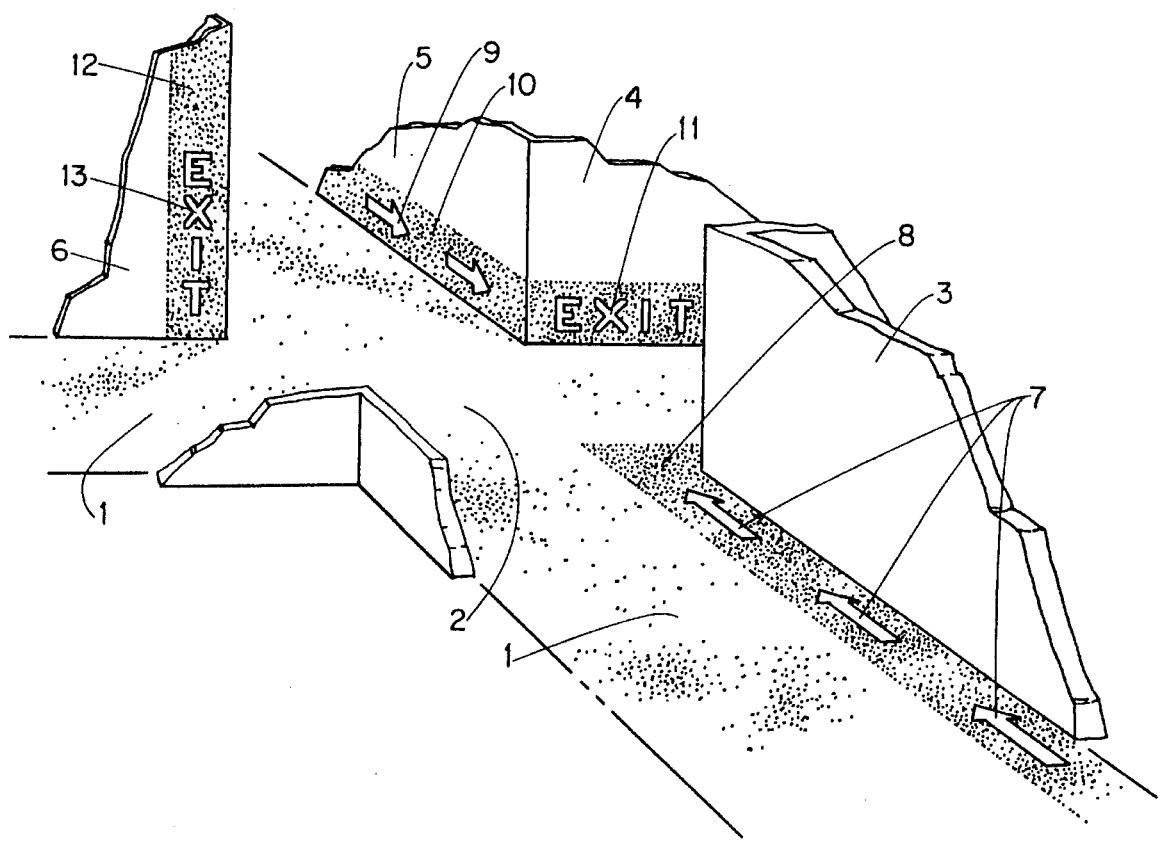
FIGURE

PHOSPHORESCENT DIRECTIONAL SIGNALS AND MANUFACTURING METHOD

This is a continuation of application Ser. No. 07/725,959 filed on Jun. 28, 1991 now abandoned, which is a continuation of application Ser. No. 07/430,763 filed on Nov. 2, 1989, now abandoned.

BACKGROUND OF THE INVENTION

It is known in, e.g., U.S. Pat. No. 4,708,817 to form artistic expressions having a latent luminescent image pattern. U.S. Pat. No. 4,413,588 describes an animal restraint collar formed of luminous or light reflective plastic material. Other patents, U.S. Pat. Nos. 4,052,610 and 4,003,507, describe luminous flashlight assemblies and holsters.

Public buildings and private buildings having high traffic patterns at all times of the day have various devices for indicating exits and traffic directions for normal times and in the event of emergencies and/or power failures. It is common, for example, to find a series of charged lights in hallways and stairwells that automatically come on in the event of an emergency or failure of electrical power to the existing system.

BRIEF DESCRIPTION OF THE PRESENT INVENTION

The present invention makes use of luminous pigments in carpeting and similar materials to form directional symbols or signs indicating traffic patterns to exits. The symbols or signs are formed in the carpeting during the manufacturing process and may or may not be, as desired, visible in natural light conditions.

The invention also comprises particular luminescent pigments found to satisfactorily withstand carpet manufacture. Phosphorescent zinc sulfide copper activated pigments belonging to the inorganic sulfides family have given satisfactory results.

BRIEF DESCRIPTION OF THE ACCOMPANYING DRAWINGS

The accompanying drawing FIGURE depicts various embodiments of the present invention in a hallway installation.

DETAILED DESCRIPTION OF THE INVENTION

Carpeting is referred to herein as a product of manufacture used for flooring or walls, usually comprising a backing material such as jute, in which filaments or fibers are looped or knitted. An adhesive may be used to bind the filaments or fibers to the backing material. The upper surface of the filaments or fibers may be subjected to further treatment, such as shearing or clipping or may be left in full looped condition, as desired.

Methods for manufacturing carpeting are well known. See, e.g., U.S. Pat. Nos. 3,024,518 and 3,842,767. U.S. Pat. No. 4,107,361 teaches the manufacturing of a grass-like carpet, also considered within this invention.

Addition of pigments and other ingredients into a polymeric means to be spun into fiber is also well known. U.S. Pat. No. 4,192,794 adds titanium dioxide pigment and a zinc salt to a polyolefin for improved visibility and stability. U.S. Pat. No. 3,205,202 also adds $TiO_2$ to synthetic polymers for "brightening" the polymer. Thermoplastic nylon materials are stabilized with copper compounds disclosed in U.S. Pat. No. 4,172,069.

In making the present invention, carpet fibers are manufactured having added therein phosphorescent pigments, specifically, zinc sulfide copper activated pigments. Two pigments that have been shown to successfully pass through fiber and carpet manufacture are United Mineral and Chemical pigments 6SSU and 100A.

The amount of pigment added to the polymer compound must be sufficient to emit enough energy to be visible in an unlighted state, but interfere with fiber spinning as little as possible. Of the pigments referred to, the addition of 2–10% appeared the satisfactory range to permit visibility but also perform well in polymer melt spinning operations. The yarn of this invention may be processed through a drawtexturing technique similar to those found in, e.g., U.S. Pat. No. 4,100,659.

EXAMPLE

In the following samples, nylon 6 polymer containing luminescent additives were spun under the following conditions:

| | |
|---|---|
| Polymer Spinning Temperature | 265° C. |
| Extruder Pressure | 1,000 PSIG |
| Throughput | 30 grams/min. |
| Spinneret | 14 hole |
| Take-up Speed | 372 mpm |

In determining the effectiveness of the additives, samples of yarn containing the additives were tufted into a 2" band in carpet construction. The carpet samples were placed in a room of about 12'×15' having a small window in the single door to the room. The samples were placed about 6 feet from the observer on a table separated from each other sufficiently to be distinguishable. Samples were marked for identification on the undersides. With the lights in the room off, enough light from outside the room was emitted by the small door window to make features in the room visible but hardly distinguishable.

The observers of the carpeting samples graded the phosphorescent quality of the samples as not visible, visible, adequate, and good. The sample graded visible could be seen in the semi-darkened room as clearly as the adequate and good samples only from a close view. The adequate and good samples could be seen clearly from 6 feet and further in the semi-darkened room.

TABLE I

| | ADDITIVE LEVEL | | |
|---|---|---|---|
| Sample | % Pigment | Pigment Type | Phosphorescence |
| 1 | — | — | None |
| 2 | 2% | 100A | Adequate |
| 3 | 5% | 100A | Good |
| 4 | 2% | 6SSU | Visible |
| 5 | 5% | 6SSU | Adequate |

The addition of dyes or other colorants to the luminescent pigmented fiber detracts from the visibility of the fiber in darkened state. It is therefore more preferable to use the fiber in its natural state or with only slight transparent dyeing. Further, because of the light or no dye treatment, the thus pigmented fiber should best be placed in an area of the carpet having less traffic. For example, the pigmented fibers can be formed in luminescent symbols placed in the 6"–12" space nearest a hallway wall, or on the wall itself. The symbols may be placed on the wall by extending, e.g., the carpeting part way up the wall.

The symbols may be in the form of arrows, darts, wording, and other directional indicia, and can be formed in the appropriate part of the carpet by directing, e.g., in the '767 patent, the pigmented yarns into the backing material 13 in the form of tufts, the tuft pattern of the pigmented yarn forming the appropriate symbol and conventional color pigmented yarns forming the remainder of the material to be tufted. The tufting pattern may be customized for a particular location or may be one that repeats for general use.

The FIGURE represents embodiments of the invention in a hallway installation. Hallway 1 represents, e.g., a hotel hallway carpeting at an intersection 2. Walls 3, 4, 5, and 6 depict walls of the intersection.

Alongside wall 3 in the floor carpeting area 8 are carpet sections 7 comprised of fibers of this invention. These sections, in the form of arrows, point toward exits from the area in the event of power failure, the phosphorescent pigments direct hall occupants toward an exit area.

Similarly, fibers of the invention in segments 9 of a wall covering 10 on wall 5 luminesce in blackout conditions, pointing the way toward an exit. Segments 11 and 13 formed in wall covering 10 and 12 of walls 5 and 6, respectively, are in the form of letters identifying an exit.

What is claimed is:

1. A tufted carpet having phosphorescent directional indicia formed in an area of the carpet which experiences low or no traffic when installed, said carpet comprising a backing, directional yarn tufts comprised of melt-spun, draw-textured phosphorescent fibers which are tufted into that portion of the carpet backing corresponding to said directional indicia so as to form said directional indicia in said low or no traffic area of the carpet, and colored yarn tufts comprised of non-phosphorescent colored fibers which are tufted into a remaining portion of said backing surrounding the phosphorescent directional indicia, wherein said phosphorescent fibers of said directional tufts are melt-spun with a zinc sulfide copper activated pigment such that said pigment is dispersed within said phosphorescent fibers.

2. The carpet of claim 1, wherein the colored fibers of said colored yarn tufts have a color which is similar in color to the phosphorescent directional indicia sufficient to render the phosphorescent directional indicia inconspicuous in natural light.

3. The carpet of claim 1, wherein the colored fibers of said colored yarn tufts have a color which is dissimilar in color to the phosphorescent directional indicia sufficient to render the phosphorescent directional indicia conspicuous in natural light.

4. The carpet of claim 1 wherein said phosphorescent fibers have a phosphorescent pigment concentration of between about 2 and about 10 percent by weight in fiber.

5. The carpet of claim 1, wherein the phosphorescent directional indicia are positioned in a low or no traffic area of the carpet which is within 12" of a wall when installed.

6. The carpet of claim 1, wherein the phosphorescent fibers of said directional yarn tufts are undyed.

7. The carpet of claim 1, wherein the phosphorescent fibers of said directional yarn tufts are transparent dyed.

* * * * *